United States Patent [19]
Creasy et al.

[11] Patent Number: 5,814,902
[45] Date of Patent: Sep. 29, 1998

[54] SYSTEM AND PROCESS FOR CONTROL OF ENERGY USE BY DIRECT OBSERVATION OF OCCUPANCY

[75] Inventors: Dennis R. Creasy; Paul Kropfeld; Gene Mauk; Dana Schmidt, all of Baltimore, Md.

[73] Assignee: Light Minder, Baltimore, Md.

[21] Appl. No.: 701,751

[22] Filed: Aug. 22, 1996

[51] Int. Cl.$^6$ ................................... G08B 13/00
[52] U.S. Cl. .................... 307/116; 307/117; 340/541; 340/565; 165/205
[58] Field of Search .................... 307/116, 117, 307/30; 340/565, 541, 825.06; 165/205; 367/93; 236/49.3

[56] References Cited

U.S. PATENT DOCUMENTS

| | | | |
|---|---|---|---|
| 4,407,447 | 10/1983 | Sayegh | 165/205 |
| 4,514,729 | 4/1985 | Szarka | 367/93 |
| 4,661,720 | 4/1987 | Cameron et al. | 307/116 |
| 5,473,202 | 12/1995 | Mudge et al. | 307/116 |
| 5,640,143 | 6/1997 | Myron et al. | 340/541 |

Primary Examiner—William M. Shoop, Jr.
Assistant Examiner—Albert W. Paladini
Attorney, Agent, or Firm—Michael D. Bednarek; Kilpatrick Stockton LLP

[57] ABSTRACT

A system and process for control of energy use in a rented room based on direct occupancy observation. The system is designed to control up to 100% of the power usage. The system includes: a power supply; occupancy sensors; a thermostat responsive to a predetermined signal; electrical outlet receptacles and/or switches that are responsive to a predetermined signal transmitted over the powerline; and a central interface unit for receiving signals from the occupancy sensors and, based on the signals received from the occupancy sensors, controlling power consumption by the thermostat and electrical outlet receptacle and/or switches. The system can be used in a process for improving energy efficiency by direct observation of occupancy of an area in multitennant facilities, such as hotels, that has a plurality of discrete living quarters. The process includes the steps of: directly sensing whether each living quarters is occupied; generating a signal indicative of the state of occupancy; transmitting the signal to a control panel; and using the control panel to control the thermostat and electrical outlet receptacle and/or switches.

13 Claims, 3 Drawing Sheets

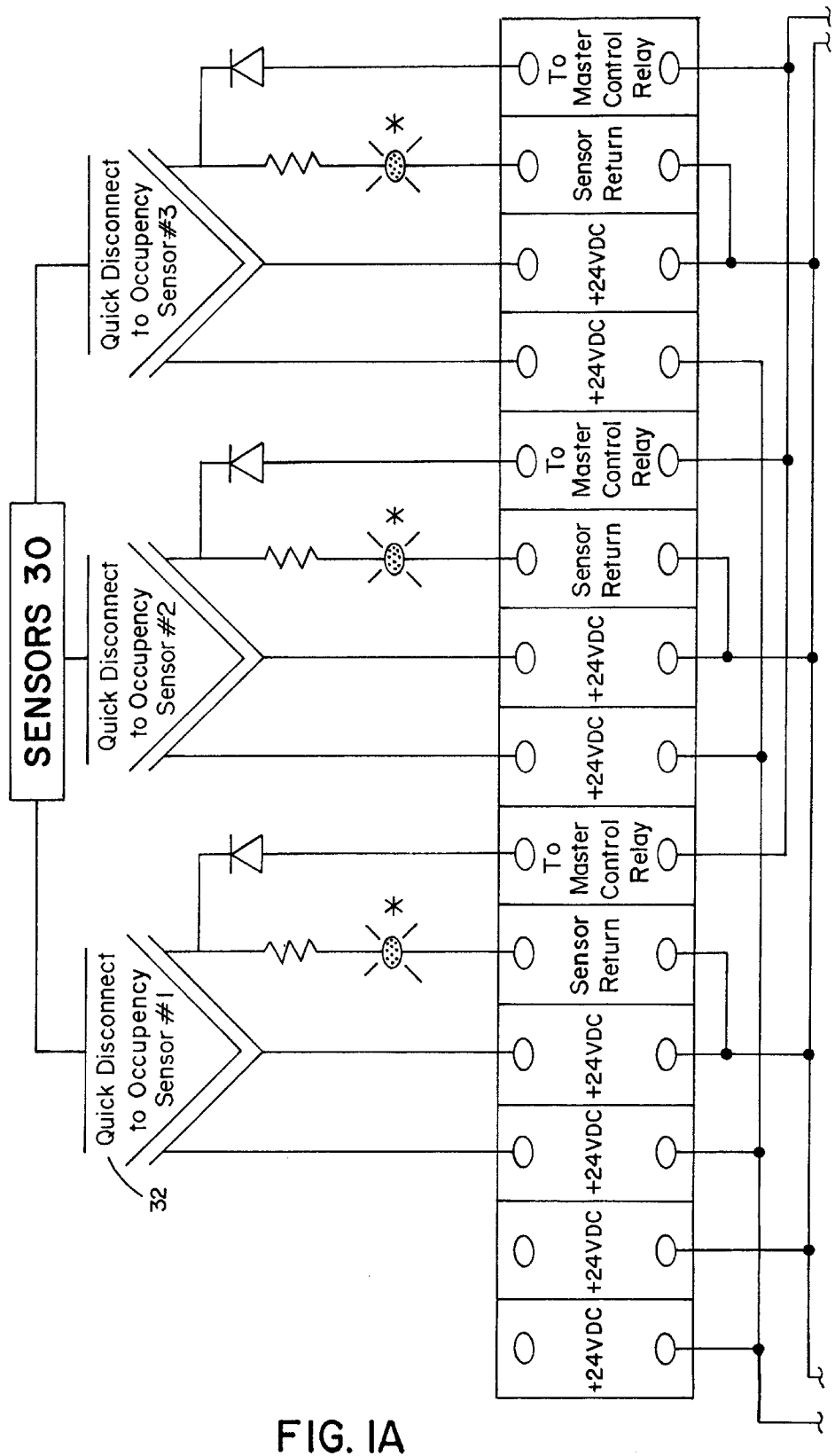
FIG. IA

SYSTEM AND PROCESS FOR CONTROL OF ENERGY USE BY DIRECT OBSERVATION OF OCCUPANCY

FIELD OF THE INVENTION

The present invention relates to systems and processes for improving energy efficiency by direct observation of occupancy of an area, especially in multitennant facilities, such as hotels and motels, where it is not practical to charge the tenants for energy consumption.

BACKGROUND OF THE INVENTION

Energy consumption is among the highest variable costs faced by any landlord. The problem is especially acute for owners and operators of hotels and motels. Currently, there is really no incentive for a person staying in a room to turn off lights or television or adjust the heating or air conditioning because they are not paying the bill. As a result, energy efficiency in hotels and motels has always been a difficult expense to control.

There have been attempts in the past to address this problem. One approach involves control of heating and air conditioning, which are the major consumer of power, from the front desk. In these systems, the front desk can turn on and off individual units when the renters or occupants check in or check out. This is relatively efficient for what it does but there is large portion of time when the room is, according to the front desk, occupied but the persons are not in there. In addition, such systems only control the heating and air conditioning and cannot control other sources of power loss without extensive rewiring.

A second known system and method involves using key-operated door locks to provide an indication of occupancy. With such systems, it is possible to determine when the occupant is reentering a room and turn on multiple power usage when the renter inserting the key into the door. However, the system has no reliable way of determining when the occupant has left the room so that the system encounters serious problems associated with turning off the power sources when the tenant leaves. There are other possible problems when there are multiple persons in and out of the room. As a consequence, key cards are not really that effective.

The present invention also relates to a specific application of power line carrier technology. A variety of systems that use power networks, for example in the home, as communication links have been proposed and developed. One group of systems, which are available, employs the X-10 protocol according to which a modulated carrier is transmitted in bursts synchronized to zero crossings of one or more mains voltage phases. According to the X-10 protocol, a binary "1" may be transmitted in the form a carrier burst at a zero crossing of the mains frequency. Conversely, a binary "0" may be transmitted in the form of the absence of a carrier at a zero crossing. Information transmitted according to this protocol is detected by a receiver that senses the presence of the communications carrier during discrete intervals separated by half cycles of the mains frequency. X-10 receiving equipment monitors the power network during power voltage zero crossings and during intervals between such crossings to determine whether received carrier pulses are, in fact, X-10 transmissions. X-10 transmissions may employ, for example, a carrier frequency of the order of 120 KHz.

X-10 modules are uniquely addressed via a house code and a unit code. Thus, all X-10 modules in the same house share the same numeric house code, which must be different from a neighbor's house code so that signals developed in a first house do not control the lights and appliances in a neighboring house. Each X-10 module in a house must have a unique numeric unit code, so that the user can uniquely select which X-10 module he desires to address. The house and unit address codes are mechanically selected with small rotary switches or thumbwheel switches on the X-10 module. When an additional new X-10 module is purchased, its house code and unit code switches must be set to meet these addressing requirements. There is no parallel to this inconvenient requirement in any other common household object.

Although extremely useful and quite popular, the X-10 system suffers from certain limitations that inhibit its application to more extensive home automation or control functions. Namely: 1) its slow data rate of approximately 120 bits per second; 2) its dependence for timing and synchronization on the AC powerline 60 Hz. zero crossing; 3) its essentially one-way communication protocol; 4) its sensitivity to electrical noise, causing both lost messages and false interpretation and spurious activation; and 5) its dependence on the user manually setting specific digital codes on electromechanical switches to establish the proper addressing of messages.

To address these concerns, there has been a move toward the so-called CEBus system and its protocol—a newer, more advanced standard system that remedies these and other limitations and enables a broader range of remote sensing, control and communication for future application in all manner of electrical and electronic devices.

The Consumer Electronic Bus (CEBus) protocol is a low cost, low speed (1000 bits per second) local area network that uses a power line carrier to send control information over typical house electrical power wiring. Such communication is useful for turning appliances and lights on and off remotely, as well as sending more sophisticated command message packets for other consumer electronics applications. CEBus is a Carrier Sense Multiple Access with Contention Resolution and Collision Detection (CSMA-CRCD) protocol, and transmits symbols using a pulse-width encoding, non-return to zero scheme.

CEBus protocol is derived from the "Homenet" protocol developed at General Electric in 1983, and is currently being incorporated into a standard by the Electronic Industries Association (EIA). CEBus protocol transmits data packets with check-sum error detection, and retransmits unacknowledged packets. CEBus is therefore more versatile than X-10, and there is a much better chance of messages getting through without error, e.g., without being falsely triggered by line noise.

Another communications technique that has been proposed is known as the Electronic Industries Association PLBus power line carrier standard. As presently proposed, this standard uses an amplitude-shift-keyed carrier transmitted during successive active intervals that alternate with quiescent intervals, when no signal is present. The duration of each interval, active or quiescent, defines the value of a respective data bit.

SUMMARY OF THE PRESENT INVENTION

It is an object of the present invention to provide an improved system and process for control of energy use in a rented room based on direct occupancy observation. The system should be able to control up to 100% of the power usage.

These and other objects are satisfied by the system and process of the present invention.

The system comprises: a power supply; a plurality of occupancy sensors; a thermostat with setback control means responsive to a predetermined signal; a plurality of electrical outlet receptacles and/or switches having an on off means responsive to a predetermined signal transmitted over the powerline; and a central interface unit for receiving signals from the occupancy sensors and, based on the signals received from the occupancy sensors, controlling the setback control means of the thermostat and on-off means of the plurality of electrical outlet receptacles and/or switches.

The present invention also provides a process for improving energy efficiency by direct observation of occupancy of an area in multitennant facilities, such as hotels, that has a plurality of discrete living quarters. The process includes the steps of: providing each living quarters with a power supply, a plurality of occupancy sensors, a thermostat with setback control means responsive to a predetermined signal, a plurality of electrical outlet receptacles and/or switches having an on off means responsive to a predetermined signal transmitted over the powerline, and a central control panel; directly sensing whether each living quarters is occupied; generating a signal indicative of the state of occupancy; transmitting the signal to a control panel; and using the control panel to control the setback control means of the thermostat and on-off means of the plurality of electrical outlet receptacles and/or switches.

The system of the present invention makes it possible to control the climate and power consumption in a room principally or solely on the basis of whether the room is actually occupied. The system of the present invention includes an interface device that serves two purposes. First, the interface receives input from multiple sensors to detect whether the area being controlled is occupied. Since the area might be composed of several rooms with different shapes and use characteristics, multiple sensors must ordinarily be used. For example, a typical hotel suite might include a front room, a bedroom and a bathroom. To determine whether there is somebody in that hotel room, one must monitor each area. Moreover, because of the nature of the control being implemented—cutting off power when a room is found to be unoccupied—it is critically important that any presence be detected. Thus, the sensors used must be sensitive enough to detect a person sleeping under covers. This is very different from a security sensing arrangement where false alarms are a major concern and less sensitive sensors must therefore be used.

The second purpose of the interface unit of the present invention is to send out multi-media signals to effect the change in the conditions controlled (heating, air conditioning and power supply) when a change in the state of occupancy of the suite is detected. In other words, the second purpose of the interface unit of the present invention is to control energy consuming devices, thermostats, receptacles, lights and so on.

It should be noted that the interface device of the present invention will receive multiple signals not necessarily relating to monitoring occupancy. For example, the interface can also be used to detect other inputs such as in a vacation home—What is the temperature of the room? Is the temperature of the room, in the positive or negative situation? Is there water present? Is there a freezing situation, is there a fire, and so on and so on. These could all be treated and handled by the interface panel of the present invention in a manner similar to that done here. All of our work is custom done so we want to leave the avenues open even though this will come from further marketing and further real life testing.

The input is of the multiple sensors—the multiple sensors is sent to an electronic OR gate. The definition of OR is one or more of the sensors is positive—if one or more of the sensors is positive then we have the output. The output is in the interface device of the present invention. A multi-media output consisting of normally, open contact closure, normally closed contact open or a powerline on or off condition. In contact closure is normally open contact. Contact open of a normally closed contact. And, on or off signal to a powerline carrier. This output will communicate with most automation system media.

The basic powerline carrier signal concept employed in the present invention is that a signal (preferably an "ON" or "OFF" signal) having an address is sent out over the existing powerline. One or more switches integrated into this powerline have an address corresponding to the signal address and receive the signal and respond accordingly. In the case of the present invention all devices in the room (receptacles, switches, thermostat) are set to one unique code or address. In this way, devices can be controlled in a programmable manner without requiring additional external wiring.

Any of a number of known type power line carrier interface modules could be used. For example, the carrier current module manufactured and sold by Leviton Mfg. Co. Inc. or module BSR-X-10 as manufactured and sold by BSR Corporation. In the preferred embodiment, at least a 256 channel capacity is provided. This is because X-10 is limited to 256 different addresses which creates complications when applied to a hotel having more that 256 rooms to be controlled. For this reason, a CEBus system and protocol could be used so that an enormous number of devices may be controlled in a programmable manner without requiring additional external wiring. CEBUS will address up to 42,000 different addresses using the same principles of X-10 over the powerline. When the number of available addresses is increased, it also becomes practical to use different addresses within a single room, if desired. One of the advantages of the interface device of the present invention is that it is not strictly limited to one technology.

Finally, the interface device of the present invention also generates power of 24 volts DC to provide power to sensors that's automatically incorporated in the panel and also preferably includes an uninterrupt power supply and/or battery back up. Naturally other voltage levels could be used, if desired.

BRIEF DESCRIPTION OF THE DRAWINGS

The currently preferred embodiment of the present invention will now be described in connection with the drawings in which.

DETAILED DESCRIPTION

Figure 1B:
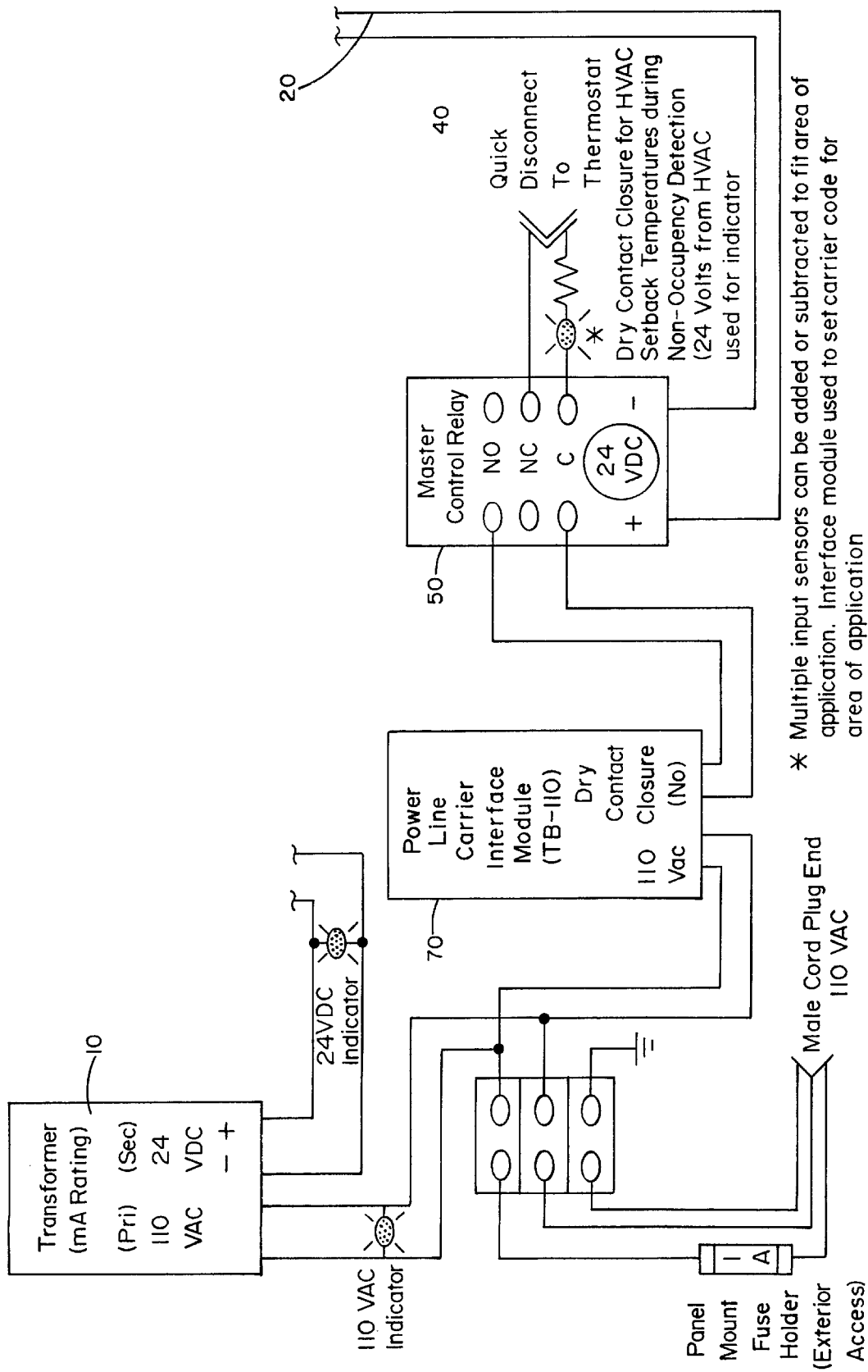
FIG. 1 is a schematic of the interface panel of the system of the present invention and the connection between that panel and other components of the system of the present invention.

As shown in FIG. 1, the system includes a transformer 10 to modify the 110 volt AC power that is gained from a receptacle into 24 volt DC. The system will use any power required for its sensors. The transformer 10 provides power not only for the panel but also power for the occupancy sensors 30. The panel shown powers three sensors, which is believed to be sufficient to cover an entire hotel suite. Naturally, more sensors could be used if desired.

Any type of occupancy sensor could be used. However, it should be noted that occupancy sensors are necessarily quite different from security sensors. With security sensors, it is critically important to avoid false alarms (false positives). In occupancy sensors, on the other hand, it is critically important to avoid turning systems off when the room is occupied (false negatives).

The sensors 30 include a quick disconnect 32 on both ends of the cable. In this way, different types of sensors 30 could connected into the same disconnect 32. The quick disconnect 32 is also useful for troubleshooting and maintenance by the hotel maintenance staff. If there is a failure a technician can simply pop in a new sensor instead of rewiring.

Each sensor in the illustrated embodiment uses three wires, the function of which will now be explained in connection with Sensor No. 1. The three wires include a 24 Volt DC positive, a 24 Volt DC negative—that provides power to the sensor—and a sensor return that indicates electronically that the sensor detects occupancy. The occupancy detected signal is in the form of a positive 24 Volts coming from the sensor. The system is wired to function as a logic gate 20 that does two things—it lights an LED indicative of which sensor has sensed occupancy, which can, for example, be used for troubleshooting. The system is also wired to act as an OR gate 20—in other words, it feeds a signal down to this line to a master control relay 50.

The master control relay 50 provides the output signals based on a OR gate 20 situation. If any sensor is receiving a signal from any of the sensors 30—that says "yes, this suite is occupied." More specifically, the system includes three sensors, each of which sends a signal and that goes into an OR gate 20.

An "occupied" signal from the OR gate 20 pulls in the master control relay 50, pulls in the contacts, changing the state of the contacts. Thus, in system with both normally closed and normally open contacts, the normally closed contact will open upon detection of occupancy and the normally open contacts will close. This is required because different control devices require different signals—some respond to normally open and some respond to normally closed contact conditions.

The thermostat 40 is directly controlled by the master control relay 50. The communications with that thermostat 40 and the sensors 30 can be performed over telephone line. Preferably, the thermostat 40 that has two modes, e.g., night time, day time or occupied or unoccupied. Thus, the master control relay 50 has a direct output to the thermostat 40 and then there is also a general output to the powerline through the powerline carrier interface module 70.

The device preferably includes a BUS so that multiple devices can be controlled by the open contacts, normal close contacts for the power.

The system also includes a powerline carrier interface module 70 that responds to a closure of a normally open contact and sends a "on" signal to any device that is on that address. Any of a number of known type power line carrier interface modules could be used. In the currently preferred embodiment, a BSR-X-10 module 70 is used. However, complications arise when applied to a hotel having more that 256 rooms because X-10 is limited to 256 different addresses. For this reason, a CEBus system and protocol could be used so that an enormous number of addresses may be controlled in a programmable manner without requiring additional external wiring. CEBUS can address up to 42,000 different addresses using the same principles of X-10 over the powerline. When the number of available addresses is increased, it also becomes practical to use different addresses within a single room, if desired. One of the advantages of the interface device of the present invention is that it is not strictly limited to one technology.

Figure 2:
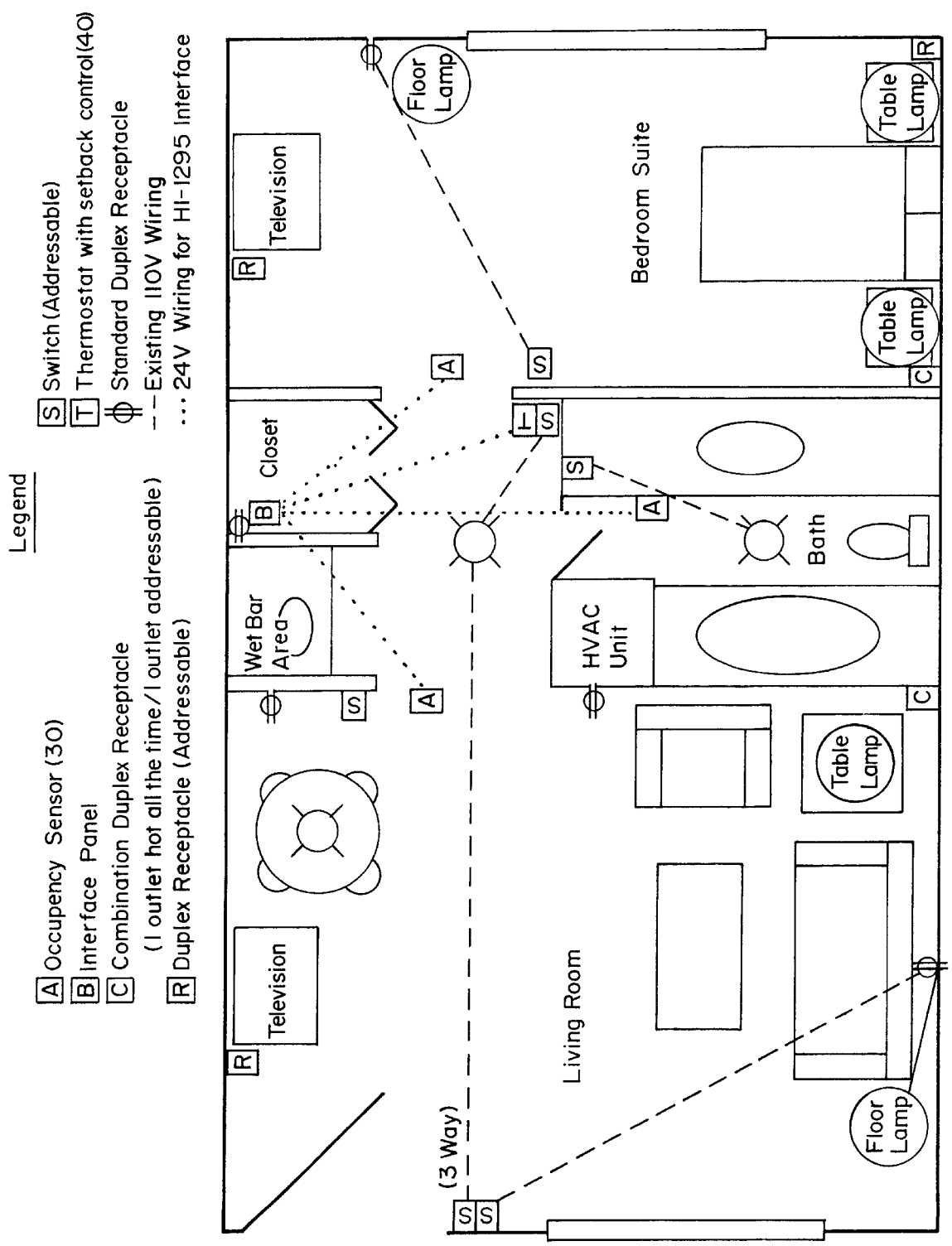
FIG. 2 is a schematic showing the layout of the system of the present invention in a hotel suite that includes a living room area, bedroom suite area, closet, a wet bar area and a television.

FIG. 2 is an application example for the interface for a typical hotel suite that includes a living room area, bedroom suite area, closet, a wet bar area, a television and a bathroom.

The system includes a plurality of occupancy sensors 30 at the locations designated "A." Only one such sensor (of variable types and manufactures) is provided in each room of this example of a hotel suite. The sensor is placed so that it determines through its view that an area is occupied. The three areas are the bedroom suite, the living room suite and the bathroom. The dotted line indicates the 24 Volt wiring.

The present invention preferably includes "dual technology sensors" that use both infrared and ultrasonic technologies. Conventional off-the-shelf sensors can be used for this purpose. These dual technology sensors are useful because sensing somebody laying in a bed under the covers is an extremely complicated situation, especially if this individual may be for some reason is not moving very much. Again, with occupancy sensors, it is critically important to avoid turning systems off when the room is occupied (false negatives).

The currently preferred form of dual technology sensor is the WATT STOPPER Model No. DT-100L dual technology sensor that combines infrared, ultrasonic and photocell technologies all in one sensor. Of course, other known types of sensors could be used, but the WATT STOPPER Model is believed to offer the highest degree of coverage and energy savings of all occupancy sensors.

Ultrasonic sensing has a great range of sensitivity and it will cover a large area including obstacles because it bounces—similar to radar. Infrared, on the other hand, is much more sensitive, but infrared is line of sight—it cannot see through walls, partitions and the like. To achieve the requisite sensitivity, therefore, the present invention employs both technologies.

The dual technology sensors are used in both bedroom and the living room. In the bathroom, however, pure ultrasonic is sufficient and, in any case, problems arise with infrared due to temperature variation. The currently preferred form of ultrasonic sensor is the WATT STOPPER series that includes Model Nos. W500A; W-1000A; W-2000A AND W-2000H (depending on the square footage of coverage). These sensors use advanced, omni-directional, Doppler technology to sense occupancy. Of course, other known types of sensors could be used, but the WATT STOPPER sensors are believed to offer the highest degree of coverage and energy savings of all occupancy sensors.

The sensors also cover the hallway so that occupancy is sensed throughout the entire suite as is clear from FIG. 2. Preferably, the wiring will be hidden under carpets using installation procedure similar to those used in security installations. Thus, one of the advantages of this invention is that it can be used in existing structures—it does not have to be necessarily hard wired to the structure.

The location of the interface panel, in the closet, is indicated at "B." This location in the closet is prepared for three reasons—1) to be generally be out of the view of the clients, 2) accessibility so that the wiring can be run down to the panels; and 3) proximity to power supply.

The system further includes a plurality of combination duplex receptacle indicated at "C." The combination duplex receptacle is a receiver device. The difference between this receptacle and the standard addressable receptacle is that one (but only one) of the two plug-in points of the normal receptacle is controlled by the power line carrier signal (in other words responds to the on/off X-10 signal). Thus, for example, if a clock is powered by this receptacle, one of the plug in points can remain active even when power to other plug in points is cut off.

The combination receptacle is one type used as indicated at "C." Another type of receptacle, indicated at "R," is the addressable duplex receptacle. Both of the two plug-in points of the addressable duplex receptacle are controlled by the power line carrier signal (respond to the on/off X-10 signal).

The system also includes addressable light switches at the locations indicated by "S." In most cases all of the switches will be replaced. Finally, "T" indicates the thermostat 40 that controls the heating and air conditioning. Again, the thermostat 40 has a two-mode (occupied/unoccupied) feature so that when the room is unoccupied the thermostat 40 goes to a predetermined, low power consumption, state. Specifically, in response to the power line carrier signal the thermostat 40 initiates a setback/reset forward that reduces the heating or air conditioning by, for example, 15 degrees. This yields substantial savings.

We claim:

1. A system for improving energy efficiency by direct sensing of occupancy of discrete suites within multisuite facilities, such as hotels, that have a plurality of discrete occupancy suites, the system comprising: a discrete energy control system within each suite, each discrete energy control system comprising: a power supply; a plurality of occupancy sensors for providing at least two different types of occupancy sensing; a first thermostat with setback control means responsive to a predetermined signal; a plurality of electrical outlet receptacles and/or switches having an on off means responsive to a second predetermined signal; and a central interface unit for receiving signals from the occupancy sensors and, based on the signals received from the occupancy sensors determining whether the suite is occupied and based on this determination, generating said first and second predetermined signals to control the setback control means of the thermostat and on-off means of the plurality of electrical outlet receptacles respectively throughout the entire suite.

2. The system of claim 1, wherein the sensors are connected to the central interface unit by a wire and the sensors include a quick disconnect on both ends of the wire.

3. The system of claim 1, wherein the thermostat that has a room occupied mode of operation and a different room unoccupied mode of operation and wherein the set back control means includes means for switching between the two modes of operation in response to the predetermined signal.

4. The system of claim 1, wherein the system includes a powerline carrier interface module.

5. The system of claim 1, wherein at least one of the sensors is a dual technology sensor that use both infrared and ultrasonic technologies.

6. The system of claim 1, wherein the plurality of electrical outlet receptacles include at least one combination duplex receptacle and at least one duplex receptacle.

7. A system for control of energy use in building that has a plurality of discrete suites, comprising:
   a plurality of sensors located in each discrete suite for sensing occupancy throughout the suite and emitting a signal indicative of the state of occupancy;
   a thermostat located in each discrete suite, the thermostat in each discrete suite including a setback control means responsive to a predetermined signal;
   a plurality of electrical outlet receptacles or switches located in each discrete suite, the plurality of electrical outlet receptacles in each discrete suite including an on off means responsive to a signal having a unique address; and
   a central interface unit located in each discrete suite for receiving signals from the occupancy sensors located in that suite and, based on the signals received from the occupancy sensors, emitting a predetermined signal for controlling the setback control means and emitting a signal having a unique address for controlling on-off means of the plurality of electrical outlet receptacles of that suite without affecting the on-off means of the plurality of electrical outlet receptacles of any other suite.

8. The system of claim 7, wherein the sensors are connected to the central interface unit by a wire and the sensors include a quick disconnect on both ends of the wire.

9. The system of claim 7, wherein the thermostat that has a room occupied mode of operation and a different room unoccupied mode of operation and wherein the set back control means includes means for switching between the two modes of operation in response to the predetermined signal.

10. The system of claim 7, wherein the system includes a powerline carrier interface module.

11. The system of claim 7, wherein at least one of the sensors is a dual technology sensor that uses both infrared and ultrasonic technologies.

12. The system of claim 7, wherein the plurality of electrical outlet receptacles and switch include at least one addressable combination duplex receptacle and at least one duplex receptacle and/or receptacle.

13. A process for improving energy efficiency by direct observation of occupancy of an area in multitennant facilities, such as hotels, that has a plurality of discrete living quarters, the process comprising the steps of: providing each living quarters with a power supply, a plurality of occupancy sensors, a thermostat with setback control means responsive to a predetermined signal, a plurality of electrical outlet receptacles or switches having an on off means responsive to a predetermined signal transmitted over the powerline, and a central control panel; directly sensing whether each living quarters is occupied; generating a signal indicative of the state of occupancy; transmitting the signal to a control panel; and using the control panel to control the setback control means of the thermostat and on-off means of the plurality of electrical outlet receptacles.

* * * * *